US011005122B2

(12) United States Patent
Jung et al.

(10) Patent No.: US 11,005,122 B2
(45) Date of Patent: May 11, 2021

(54) BATTERY HOUSING STRUCTURE INCLUDING PLURALITY OF ELASTIC MEMBERS, AND BATTERY APPARATUS INCLUDING THE SAME

(71) Applicant: Samsung Electronics Co., Ltd., Suwon-si (KR)

(72) Inventors: Youngsuk Jung, Suwon-si (KR); Boksoon Kwon, Suwon-si (KR); Eunha Lee, Seoul (KR); Seongho Jeon, Yongin-si (KR); Heechul Jung, Gunpo-si (KR); Sungnim Jo, Seoul (KR); Sungsoo Han, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 180 days.

(21) Appl. No.: 16/183,853

(22) Filed: Nov. 8, 2018

(65) Prior Publication Data

US 2019/0280325 A1 Sep. 12, 2019

(30) Foreign Application Priority Data

Mar. 7, 2018 (KR) ........................ 10-2018-0027109

(51) Int. Cl.
*H01M 10/04* (2006.01)
*H01M 2/10* (2006.01)

(52) U.S. Cl.
CPC ..... *H01M 10/0481* (2013.01); *H01M 2/1022* (2013.01)

(58) Field of Classification Search
CPC ........................ H01M 10/0481; H01M 2/1022
USPC .......................................................... 429/163
See application file for complete search history.

(56) References Cited

U.S. PATENT DOCUMENTS 2,812,376 A * 11/1957 Yardney ............. G01R 31/3665 429/66
6,899,975 B2 5/2005 Watanabe et al.
7,833,678 B2 11/2010 Inagaki
9,099,714 B2 8/2015 Bechtold et al.
9,680,138 B2 6/2017 Ejima
(Continued)

FOREIGN PATENT DOCUMENTS

JP 2016012456 A * 1/2016
JP 6225082 B2 11/2017
(Continued)

*Primary Examiner* — Sean P Cullen
(74) *Attorney, Agent, or Firm* — Harness, Dickey & Pierce, P.L.C.

(57) ABSTRACT

Battery housing structures and battery apparatuses including the same are provided. A battery housing structure may include a case including an accommodation region in which a battery unit is accommodated, and an elastic member assembly provided in the case and configured to apply a pressure to the battery unit accommodated in the accommodation region. The elastic member assembly may include at least one first elastic member having an elastic coefficient that increases when a displacement increases and at least one second elastic member having an elastic coefficient that decreases when a displacement increases. The at least one first elastic member and the at least one second elastic member may have different structures or may be arranged in different directions.

20 Claims, 13 Drawing Sheets

20
30
10
E10 (S2)
E20 (S3)
200
P10
100
P20
Z
Y
X

(56) References Cited

U.S. PATENT DOCUMENTS

2010/0190049 A1* 7/2010 Kawase ............ H01M 10/0481
429/159
2012/0107678 A1* 5/2012 Kim ...................... H01M 10/04
429/186
2017/0035584 A1 2/2017 Ha et al.
2018/0151856 A1* 5/2018 Fischer ............. H01M 10/0481

FOREIGN PATENT DOCUMENTS

KR 100745844 B1 8/2007
KR 20170017575 A 2/2017
KR 20170050875 A 5/2017

* cited by examiner

<COMPARATIVE EXAMPLE>

BATTERY HOUSING STRUCTURE INCLUDING PLURALITY OF ELASTIC MEMBERS, AND BATTERY APPARATUS INCLUDING THE SAME

CROSS-REFERENCE TO RELATED APPLICATION

This application claims the benefit of Korean Patent Application No. 10-2018-0027109, filed on Mar. 7, 2018, in the Korean Intellectual Property Office, the disclosure of which is incorporated herein in its entirety by reference.

BACKGROUND

1. Field

The present disclosure relates to battery housing structures and battery apparatuses including the same.

2. Description of the Related Art

Various types of secondary batteries, such as a cylindrical type, a coin type, a pouch type, a prismatic type, etc., have been developed. These batteries may be stacked to form a larger capacity battery. Packs including secondary batteries may also be of various types such as a square type, a can type, etc. Inner batteries may be fitted into an outer pack, or positions of the inner batteries may be fixed with a space margin with respect to the outer pack.

Secondary batteries may have a stacked structure including a cathode, a separator, an anode, and a collector. A smooth contact between components may affect the performance of a secondary battery. A process such as rolling may be performed to improve or optimize the adhesion between the components and their density. When secondary batteries are charged and discharged, since electrochemical reactions and migration of metal ions occur therein, a volume change may occur due to expansion/contraction of an electrode material, a minute amount of gas generated from an electrolyte, and the like. Such volume change and deterioration of the contact characteristics between components may degrade the battery performance.

SUMMARY

Provided are battery housing structures configured to reduce or suppress deterioration of the performance of a battery.

Provided are battery housing structures configured to improve a capacity retention ratio (CRR) of a battery.

Provided are battery housing structures in which a pressure applied to a battery during charging or discharging of the battery is maintained constant, substantially constant, or at an appropriate value.

Provided are battery apparatuses including the battery housing structures.

Additional aspects will be set forth in part in the description which follows and, in part, will be apparent from the description, or may be learned by practice of the presented example embodiments.

According to an aspect of an example embodiment, a battery housing structure includes a case including an accommodation region in which a battery unit including at least one battery cell is accommodated; and at least two elastic members in the case and configured to apply a pressure to the battery unit accommodated in the accommodation region, wherein the at least two elastic members may include at least one first elastic member having an elastic coefficient that increases when a displacement increases and at least one second elastic member having an elastic coefficient that decreases when a displacement increases.

The at least two elastic members may be configured such that a change range of the pressure applied to the battery unit is within 10% of an initial pressure with respect to a dimension change during charging and discharging of the battery unit.

The at least two elastic members may be configured such that a total elastic coefficient varies within 10% with respect to a volume change of the accommodation region corresponding to a dimension change during charging and discharging of the battery unit.

The at least one first elastic member and the at least one second elastic member may have different structures or are arranged in different directions.

The at least one first elastic member may include a coil type first spring member or a second spring member having a structure bent in a direction perpendicular to a displacement direction, and the at least one second elastic member may include a third spring member having a structure bent in a direction parallel to a displacement direction.

The second spring member may have a C-shaped or U-shaped structure and has an open structure in a direction perpendicular to the displacement direction, and the third spring member may have a V-shaped, C-shaped or U-shaped structure and has an open structure in a direction parallel to the displacement direction.

The second spring member may have a radius of curvature greater than zero and less than 100 mm at its central portion.

The third spring member may have a folding angle greater than 10° and less than 170°.

At least one of the second spring member and the third spring member may include first and second portions that form an angle; and a ring type connector disposed between the first and second portions to connect the first and second portions.

The battery housing structure may further include a first plate on a first surface side of the accommodation region in the case; and a second plate on a second surface side of the accommodation region, wherein the at least two elastic members are between the first plate and the case and between the second plate and the case.

The at least two elastic members may include a plurality of first elastic members provided between the first plate and the case; and a plurality of second elastic members provided between the second plate and the case.

The at least two elastic members may include a plurality of first elastic members and a plurality of second elastic members alternately between the first plate and the case; and a plurality of first elastic members and a plurality of second elastic members alternately between the second plate and the case.

The battery housing structure may further include a third plate provided in a lower portion or an upper portion of the accommodation region in the case, wherein at least a part of the at least two elastic members are between the third plate and the case.

The at least two elastic members may include the at least one first elastic member and the at least one second elastic member between the third plate and the case.

The at least two elastic members may include a plurality of first elastic members on a first side of the accommodation region and a plurality of second elastic members on a second side of the accommodation region, or the at least one first elastic member and the at least one second elastic member alternately arranged on each of the first side and the second side of the accommodation region.

The at least two elastic members may include the at least one first elastic member and the at least one second elastic member alternately arranged in a lower portion or an upper portion of the accommodation region.

The accommodation region may have a cylindrical shape, and the at least two elastic members may include a plurality of first elastic members and a plurality of second elastic members dispersedly disposed around the accommodation region.

The at least two elastic members may include one or more spring members, and the one or more spring members may include one of a metal, an organic polymer, and an organic-inorganic composite.

According to an aspect of another example embodiment, a battery apparatus includes the battery housing structure; and the battery unit embedded in an accommodation region of the battery housing structure.

The battery unit may include at least one battery cell, and the battery unit or the at least one battery cell may have a pouch, cylinder, prism, or coin cell structure.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
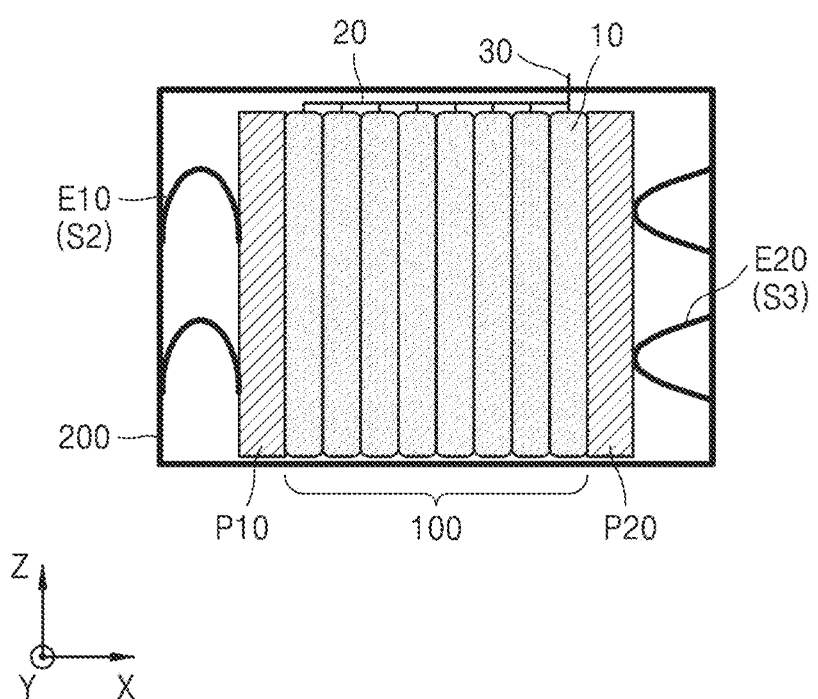
FIG. 1 is a cross-sectional view illustrating a battery having a battery housing structure according to an example embodiment.

Various example embodiments will now be described more fully with reference to the accompanying drawings in which example embodiments are shown.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein the term "and/or" may include any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, when the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, a battery housing structure according to example embodiments and a battery apparatus using the same will be described in detail with reference to the accompanying drawings. The width and thickness of layers or regions illustrated in the accompanying drawings may be somewhat exaggerated for clarity and ease of description. Like reference numerals designate like elements throughout the specification.

FIG. 1 is a cross-sectional view illustrating a battery having a battery housing structure according to an example embodiment.

Referring to FIG. 1, a case 200 may have an accommodation region in which a battery unit 100 including at least one battery cell 10 is accommodated. An elastic member assembly (e.g., E10+E20) is arranged in the case 200 to apply pressure to the battery unit 100 accommodated in the accommodation region. The elastic member assembly may include at least one first elastic member E10 having an elastic coefficient that increases in accordance with a displacement increase and at least one second elastic member E20 having an elastic coefficient that decreases in accordance with a displacement increase. The first elastic member E10 and the second elastic member E20 may have different structures or may be arranged in different directions. The first elastic member E10 may include a coil type first spring member (S1 in FIG. 2) or a second spring member S2 having a structure bent in a direction perpendicular to a displacement direction. FIG. 1 shows the first elastic member E10 including the second spring member S2. The second elastic member E20 may include a third spring member S3 having a structure bent in a direction parallel to a displacement direction.

The elastic member assembly (e.g., E10+E20) may be configured such that a change range of the pressure applied to the battery unit 100 with respect to a dimension (volume) change during charging and discharging of the battery unit 100 is within about 10%. The elastic member assembly may be configured such that the change range of the pressure is within about 5%, about 3%, or about 1% of an initial pressure. In other words, even when the volume changes according to charging/discharging of the battery unit 100, the pressure (internal pressure) applied to the battery unit 100 may be maintained constant or substantially constant by a configuration of the elastic member assembly. The elastic member assembly may include the first elastic member E10 having the elastic coefficient increasing in accordance with the displacement increase and the second elastic member E20 having the elastic coefficient decreasing in accordance with the displacement increase. The pressure applied to the battery unit 100 may be maintained substantially constant by the configuration. In this regard, the 'initial pressure' may refer to a pressure at which the battery unit 100 is first installed in the accommodation region of the case 200 or a pressure at which charging of the battery unit 100 is completed or a pressure of a state where discharging is completed.

The total elastic coefficient of the elastic member assembly (e.g., E10+E20) may change within about 10% with respect to the volume change of the accommodation region corresponding to the dimension change due to charging/discharging of the battery unit 100. With respect to the volume change of the accommodation region, a change in the total elastic coefficient of the elastic member assembly may be within about 5%, within about 3%, or within about 1%. In other words, even when the volume changes according to charging/discharging of the battery unit 100, the total elastic coefficient of the elastic member assembly may be maintained constant or substantially constant.

When the first elastic member E10 includes the second spring member S2, the second spring member S2 may have a C-shape, a U-shape, or a similar shape. The second spring member S2 may have an open structure in a direction perpendicular to the displacement direction. In this regard, the displacement direction may be a direction parallel to an X axis. The second spring member S2 may have a radius of curvature greater than zero and less than about 100 mm at its central portion. The central portion of the second spring member S2 may have a radius of curvature greater than or equal to about 3 mm and less than or equal to about 90 mm.

When the second elastic member E20 includes the third spring member S3, the third spring member S3 may have a V-shape, a C-shape, a U-shape or a similar shape. The third spring member S3 may have an open structure in a direction parallel to the displacement direction (for example, a direction parallel to the X axis). The third spring member S3 may have a folding angle greater than about 0° and less than about 180° . For example, the folding angle of the third spring member S3 may be greater than about 10° and less than about 170°.

The first and second elastic members E10 and E20 may include any one of metal, organic polymer, and organic-inorganic composite. For example, the first and second elastic members E10 and E20 may include a metal such as Al, Cu, stainless steel, or the like, or may include various plastic materials or an organic-inorganic composite material.

The battery housing structure according to example embodiments may further include a first plate P10 provided on a first surface side of the battery unit 100 and a second plate P20 provided on a second surface side of the battery unit 100. The second surface may be a surface (e.g., an opposite surface) facing the first surface. A plurality of first elastic members E10 may be disposed between the first plate P10 and the case 200. A plurality of second elastic members E20 may be disposed between the second plate P20 and the case 200.

The battery cell 10 may be, in an example embodiment, a pouch type cell. A plurality of battery cells 10 may be stacked in the X axis direction to form one battery unit 100. A connecting member 20 connected to the plurality of battery cells 10 may be further provided. A terminal 30 connected to the connecting member 20 and protruding from the case 200 may be further provided. Although only one set of connecting members 20 is illustrated and only one terminal 30 is shown here, a plurality of connecting members 20 and a plurality of terminals 30 may be provided. The case 200 may include at least one of various materials such as a metal, an organic polymer, and an organic-inorganic composite material.

Figure 2:
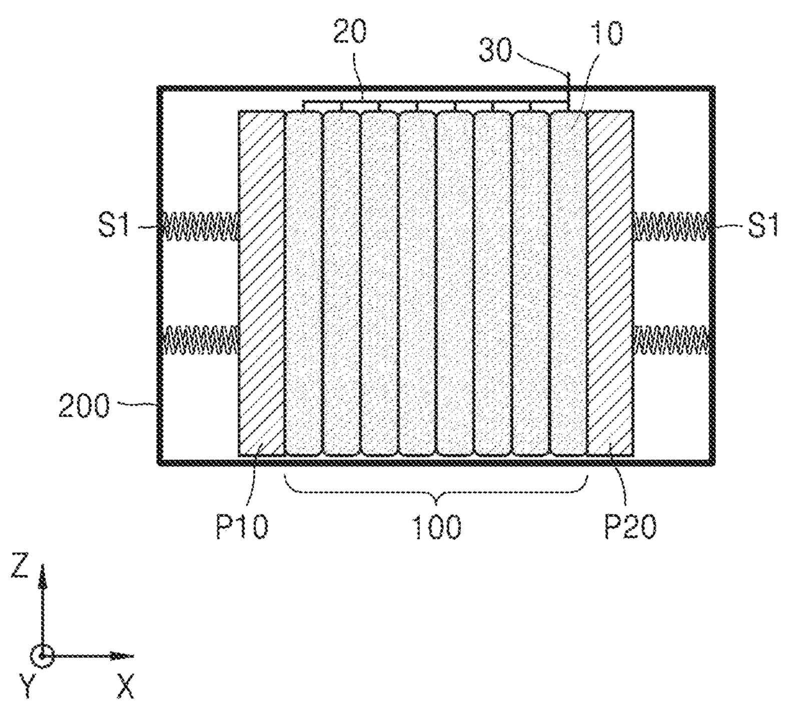
FIG. 2 is a cross-sectional view showing a battery having a battery housing structure according to a comparative example.

FIG. 2 is a cross-sectional view showing a battery having a battery housing structure according to a comparative example.

Referring to FIG. 2, the battery housing structure according to the comparative example uses a plurality of first spring members S1. The coil type first spring members S1 are arranged in both sides of the battery unit 100. The first spring members S1 are springs having an elastic coefficient that increases in accordance with a displacement increase. Therefore, when the battery unit 100 expands during a charging/discharging operation, the elastic coefficient of the first spring members S1 increases in accordance with a volume increase of the battery unit 100. As a result, a pressure applied to the battery unit 100 increases. Since charging and discharging are repeated, the pressure applied to the battery unit 100 and the battery cell 10 may reach a maximum value of several giga pascals (Gpa). In other words, since a displacement of the first spring members S1 increases, the pressure applied to the battery unit 100 and the battery cell 10 may increase. Such an increase in pressure may deteriorate performance of a battery such as a capacity retention ratio (CRR). Also, the increase of the pressure may cause problems such as distortion and reduction of contact characteristics between components of the battery cell 10.

Figure 3:
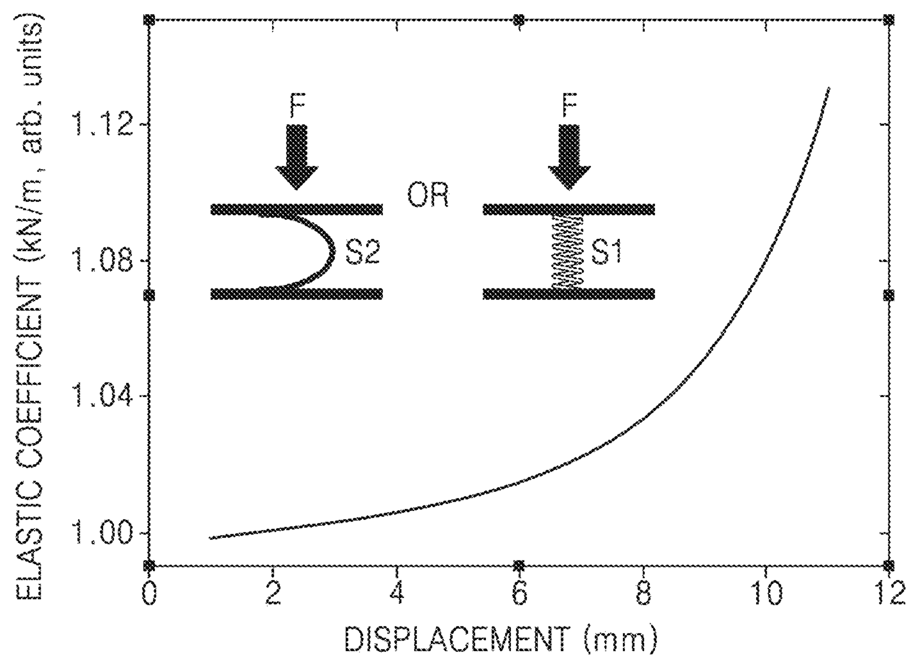
FIG. 3 is a graph showing change characteristics of an elastic coefficient with respect to a displacement of a first spring member or a second spring member.

FIG. 3 is a graph showing change characteristics of an elastic coefficient with respect to a displacement of the first spring member S1 or the second spring member S2.

Referring to FIG. 3, the elastic coefficient of the first spring member S1 or the second spring member S2 may increase since the displacement increases. In other words, since a force F is applied to the spring members S1 and S2 to generate the displacement, the force F to be applied for the same displacement may increase. In this regard, the elastic coefficient may increase exponentially or similarly.

Figure 4:
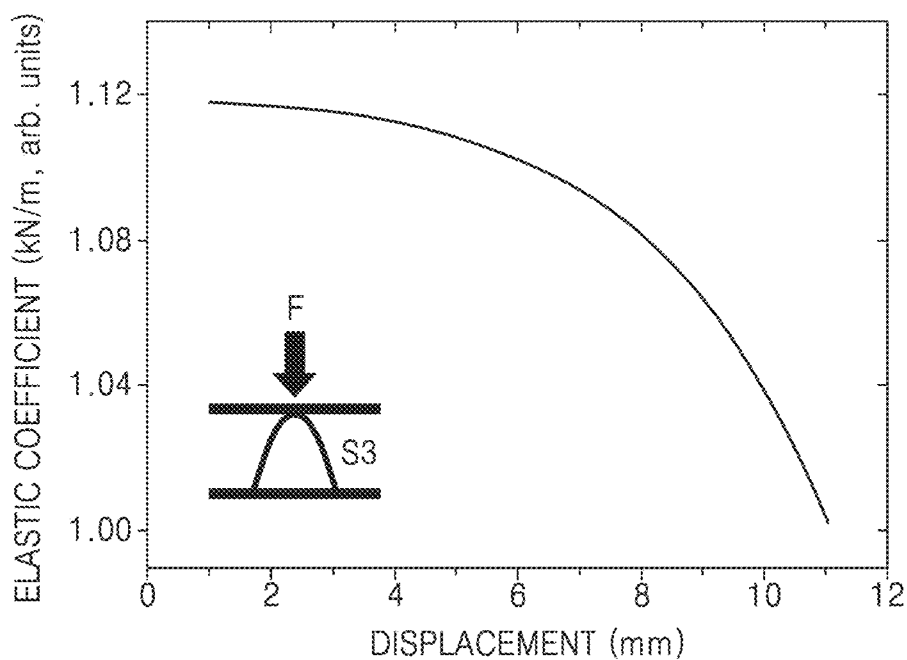
FIG. 4 is a graph showing change characteristics of an elastic coefficient with respect to a displacement of a third spring member.

FIG. 4 is a graph showing change characteristics of an elastic coefficient with respect to a displacement of the third spring member S3.

Referring to FIG. 4, the elastic coefficient of the third spring member S3 may decrease since the displacement increases. In other words, although a large force is required in an initial stage of causing the displacement of the third spring member S3, the displacement may be generated with a relatively small force since the displacement increases. In this regard, the coefficient of elasticity may decrease quadratically or similarly.

Figure 5:
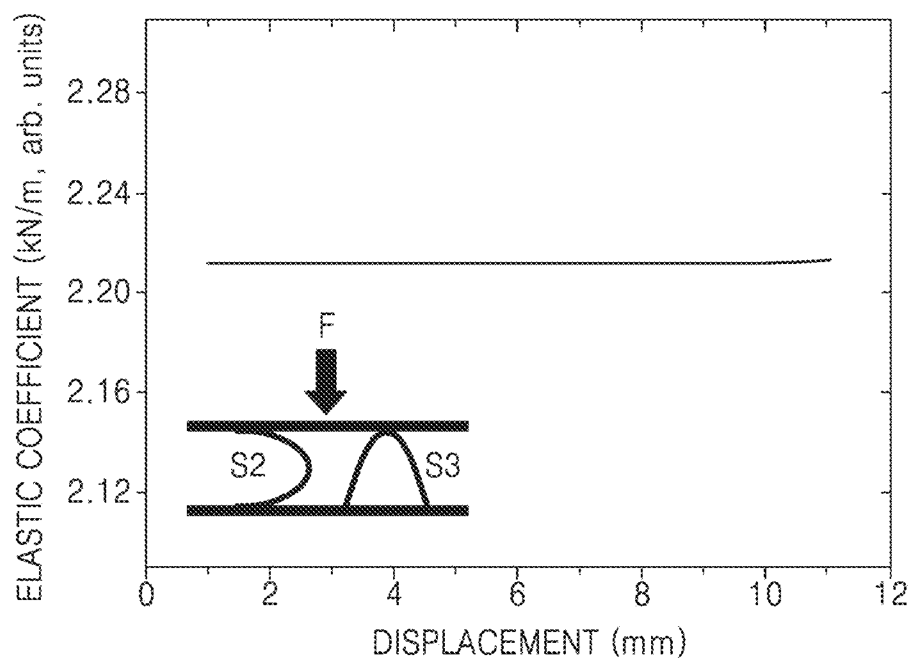
FIG. 5 is a graph showing change characteristics of an elastic coefficient with respect to a displacement when a force is applied to a combination of a second spring member and a third spring member.

FIG. 5 is a graph showing change characteristics of an elastic coefficient with respect to a displacement when the force F is applied to a combination of the second spring member S2 and the third spring member S3.

Referring to FIG. 5, since the second spring member S2 and the third spring member S3 have the elastic coefficient characteristics which change inversely with respect to a displacement increase, with respect to an assembly in which the second spring member S2 and the third spring member S3 are combined, the total elastic coefficient may be maintained constant or substantially constant even when the displacement increases. Therefore, when these two types of springs S2 and S3 are used together, even when a volume of a battery changes, the pressure applied to the battery may be maintained constant or substantially constant. In other words, regardless of a volume change of the battery, the pressure applied to the battery may be maintained constant or substantially constant. A similar effect may be obtained by using the first spring member S1 instead of the second spring member S2 in the combination of the second spring member S2 and the third spring member S3.

An elastic coefficient of a spring may be adjusted according to a shape, material and dimension of the spring, and a pressure suitable for the use environment may be provided. The spring may include various materials such as metal, plastic, and organic-inorganic composite. A C or U-shaped spring may change the elastic coefficient according to a radius of curvature of a central portion, and a V-shaped spring may change the elastic coefficient according to a folding angle.

Figure 6:
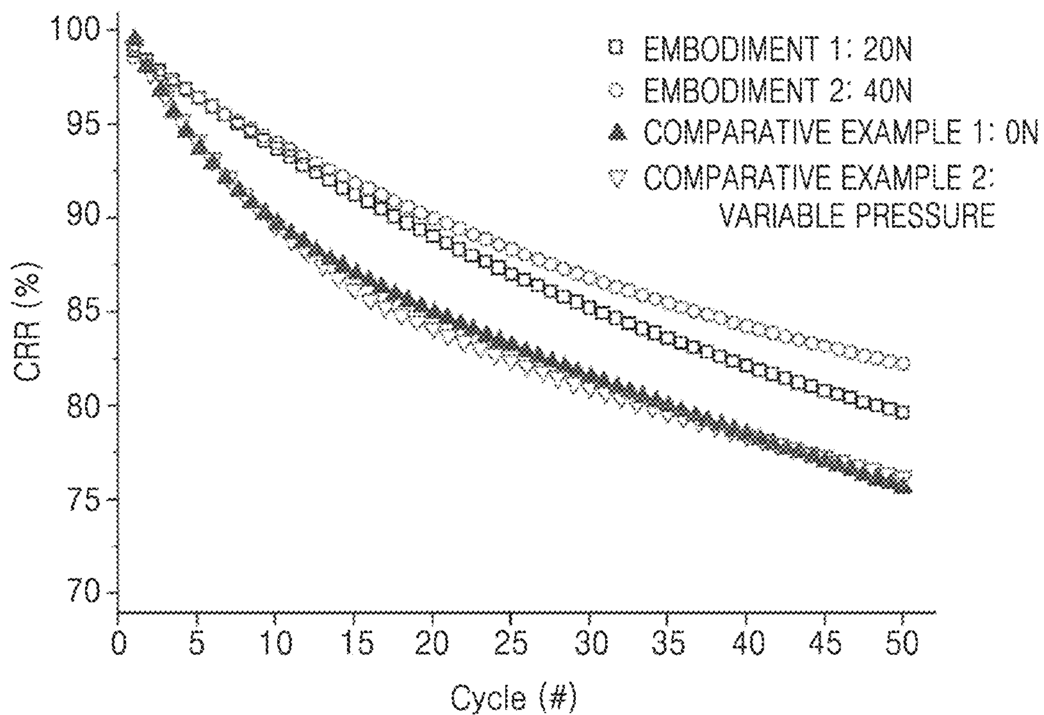
FIG. 6 is a graph showing a result of measuring a performance change of a battery according to a use condition of an elastic member (spring)

FIG. 6 is a graph showing a result of measuring a performance change of a battery according to a use condition of an elastic member (spring). FIG. 6 shows a result of measuring a change in a capacity retention ratio (CRR) % of the battery in each of a condition (example embodiments 1 and 2) where charging/discharging are performed in a state where force of 20 N and 40 N (30 kPa and 60 kPa, respectively) that are fixing pressure is applied to the pouch type battery, a condition of 0 N where no force is applied as comparative example 1, and a “variable pressure” condition in which the pressure increases gradually since the battery expands without applying an initial force as comparative example 2.

Referring to FIG. 6, after performing charging/discharging of 50 cycles, a high efficiency maintenance result of about 5 to 7% was observed in the fixing pressure (example embodiments 1 and 2) condition when comparing with the variable pressure (comparative example 2) or no pressure (comparative example 1) condition. Therefore, the efficiency maintenance characteristic of the battery may be improved when the fixing pressure is constantly applied rather than when the pressure applied to the battery changes (substantially change) or when there is no pressure applied to the battery.

Figure 7:
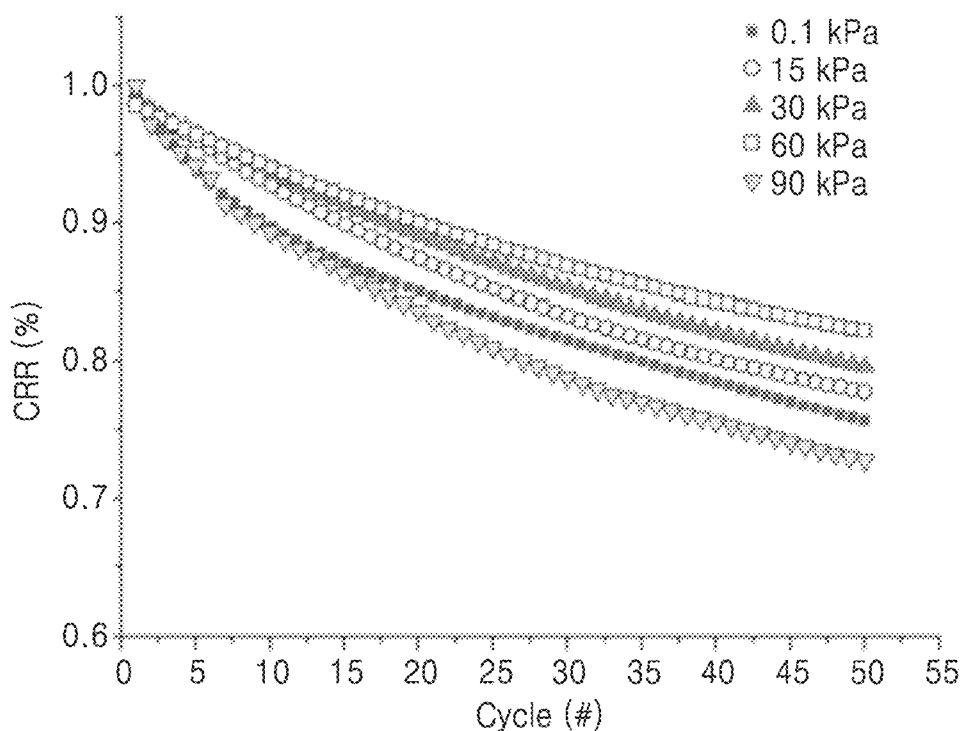
FIG. 7 is a graph showing a result of measuring a change in a capacity retention ratio (CRR) % according to a pressure applied to a battery cell.

FIG. 7 is a graph showing a result of measuring a change in a capacity retention ratio (CRR) % according to a pressure applied to a battery cell. This result relates to a pouch type battery cell to which a Si-C anode is applied.

Referring to FIG. 7, when a pressure (a fixing pressure) increases from 0.1 kPa to about 60 kPa, the CRR % tends to increase and when the pressure (the fixing pressure) is 90 kPa, the CRR % decreases. From these results, it may be seen that it is advantageous to maintain the efficiency of the battery cell when a predetermined (or alternatively, desired) range of pressure is applied constantly.

On the other hand, although not shown, the change in the CRR with respect to the pressure is relatively small with respect to the pouch type battery cell to which a graphite anode is applied. According to a kind and material composition of the battery used, an influence of the pressure may vary.

Figure 8:
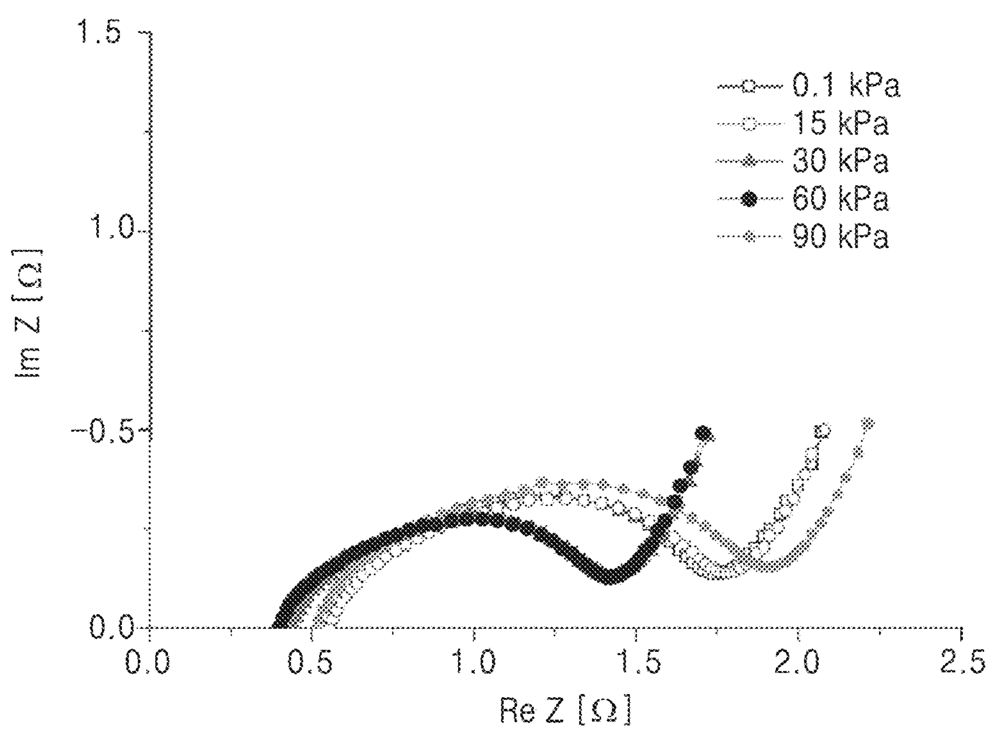
FIG. 8 is a graph showing a change in the complex impedance according to a pressure applied to a battery cell.

FIG. 8 is a graph showing a change in the complex impedance according to a pressure applied to a battery cell. In FIG. 8, Re Z (Ω) in an X axis is a real part of the composite impedance and Im Z (Ω) in a Y axis is an imaginary part. This result relates to a pouch type battery cell to which a Si-C anode is applied.

The result of measuring a solution resistance Rs and an interface resistance Rct under each pressure (P) condition is summarized in Table 1 as follows.

TABLE 1

| P (kPa) | Rs (Ω) | Rct (Ω) |
|---|---|---|
| 0.1 | 0.5031 | 1.3643 |
| 15 | 0.5342 | 1.3501 |
| 30 | 0.4253 | 1.1163 |
| 60 | 0.3856 | 1.1474 |
| 90 | 0.4939 | 1.5310 |

Referring to Table 1, the interface resistance Rct tends to decrease since the pressure (fixing pressure) for a battery cell increases from 0.1 kPa to about 60 kPa, and when the pressure (fixing pressure) is 90 kPa, the interface resistance Rct increases. From these results, it may be predicted that an appropriate (optimal) pressure that affects the performance of the battery cell is present.

On the other hand, although not shown, a change in the interface resistance Rct according to the pressure is relatively small with respect to the pouch type battery cell to which a graphite anode is applied.

Figure 9:
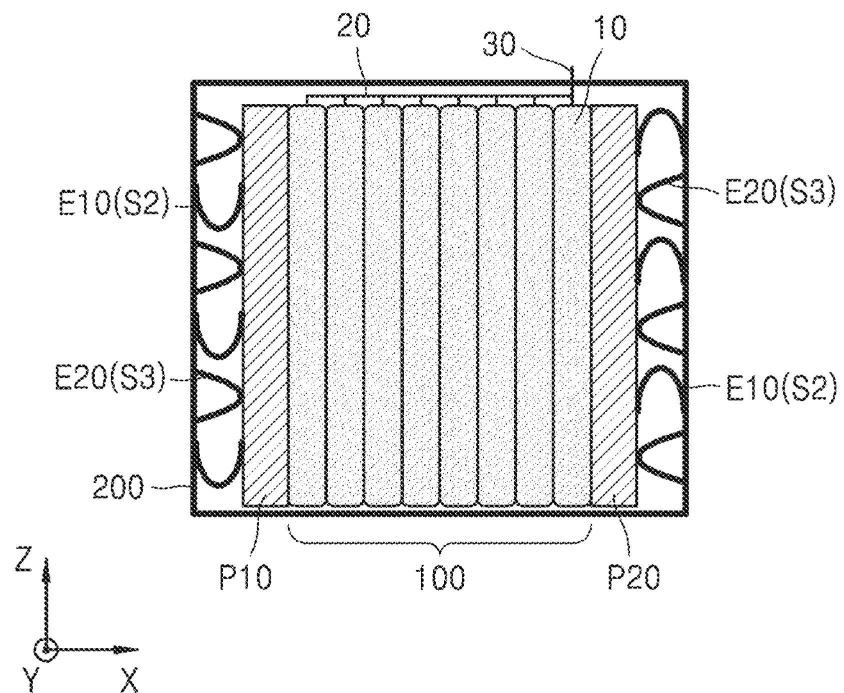
FIG. 9 is a cross-sectional view showing a battery having a battery housing structure according to another example embodiment.

FIG. 9 is a cross-sectional view showing a battery having a battery housing structure according to another example embodiment.

Referring to FIG. 9, a plurality of first elastic members E10 and a plurality of second elastic members E20 may be alternately arranged on one side of the battery unit 100, and the plurality of first elastic member E10 and the plurality of second elastic members E20 may be alternately arranged on another side of the battery unit 100. The first elastic members E10 and the second elastic members E20 may be alternately and repeatedly arranged between the first plate P10 and the case 200. The first elastic members E10 and the second elastic members E20 may also be alternately repeatedly arranged between the second plate P20 and the case 200. The second elastic member E20 may be correspondingly disposed on the second plate P20 with respect to the first elastic member E10 on the first plate P10. The first elastic member E10 may also be correspondingly disposed on the second plate P20 with respect to the second elastic member E20 on the first plate P10. However, this is merely an example, and an arrangement method and the number of the elastic members E10 and E20 may be variously changed. The total number of the plurality of first elastic members E10 and the total number of the plurality of second elastic members E20 may be the same or similar to each other, but they may be different. A difference between the number of the first elastic members E10 and the number of the second elastic members E20 may be within, for example, about 20% or less.

The first elastic member E10 and the second elastic member E20 may be arranged alternately on both sides of the battery housing as in the present example embodiment, and thus even when the battery unit 100 expands, a constant or a substantially constant pressure may be applied to the battery unit 100.

Figure 10:
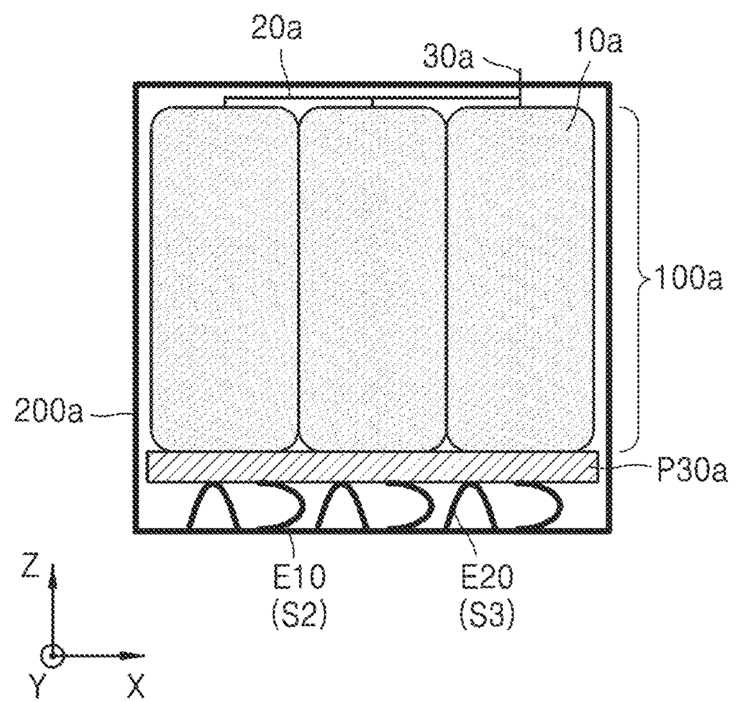
FIG. 10 is a cross-sectional view showing a battery having a battery housing structure according to another example embodiment.

FIG. 10 is a cross-sectional view showing a battery having a battery housing structure according to another example embodiment.

Referring to FIG. 10, a battery unit 100*a* including at least one battery cell 10*a* may be provided in an accommodation region of the case 200*a*. A plate P30*a* may be provided in the case 200*a* at a lower portion or an upper portion of the accommodation region. In this regard, FIG. 10 shows the plate P30*a* provided in the lower portion of the accommodation region. At least a part of an elastic member assembly according to the present example embodiment may be disposed between the plate P30*a* and the case 200*a*. The elastic member assembly may include the first elastic member E10 and the second elastic member E20 disposed between the plate P30*a* and the case 200*a*. A plurality of first elastic members E10 and a plurality of second elastic members E20 may be alternately arranged between the plate P30*a* and the case 200*a*. Reference numerals 20*a* and 30*a* denote a connecting member and a terminal, respectively.

In the present example embodiment, the battery cell 10*a* may be a cylinder or prism type, a circular battery cell, or a flat type battery cell. Although FIG. 10 shows the first and second elastic members E10 and E20 alternately disposed in the lower portion of the battery unit 100*a*, the first and second elastic members E10 and E20 may be arranged alternately in the upper portion of the battery unit 100*a* or the first and second elastic members E10 and E20 may be arranged alternately on the lower portion and the upper portion, respectively. With this arrangement method, even when a volume of the battery unit 100*a* expands, a fixing pressure may be applied to the battery unit 100*a*. Also, it is possible to reduce or suppress a problem of distortion of components of the battery cell 10*a* and/or a problem of deterioration of contact characteristics.

Figure 11:
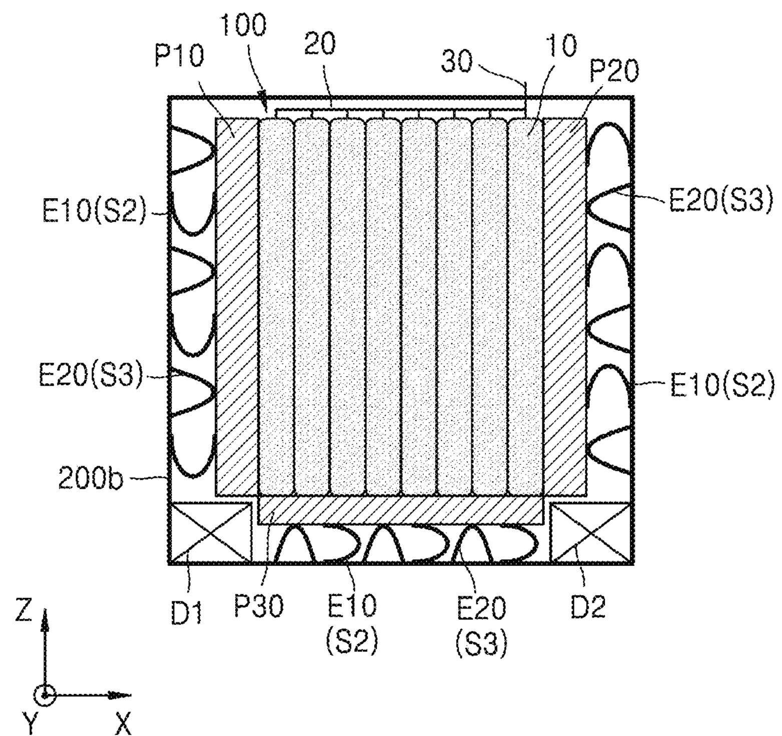
FIG. 11 is a cross-sectional view showing a battery having a battery housing structure according to another example embodiment.

FIG. 11 is a cross-sectional view showing a battery having a battery housing structure according to another example embodiment.

Referring to FIG. 11, the battery housing structure according to the present example embodiment is modified from that shown in FIG. 9 and may further include the third plate P30 and a plurality of first and second elastic members E10 and E20 alternately arranged below the third plate P30, in addition to the structure of FIG. 9. The third plate P30 may be provided at a lower portion of the case 200*b* and the plurality of first and second elastic members E10 and E20 may be alternately arranged between the third plate P30 and the case 200*b*.

First and second position adjusting members D1 and D2 may be further provided on a lower corner of the case 200*b*. The first position adjusting member D1 may be disposed adjacent to the first plate P10 and the third plate P30 at a first corner and the second position adjusting member D2 may be disposed adjacent to the second plate P20 and the third plate P30 at a second corner. The position adjusting members D1 and D2 may serve to adjust or fix positions of the plates P10, P20 and P30 within a predetermined (or alternatively, desired) range. The position adjusting members D1 and D2 may act as supports or guides.

Figure 12:
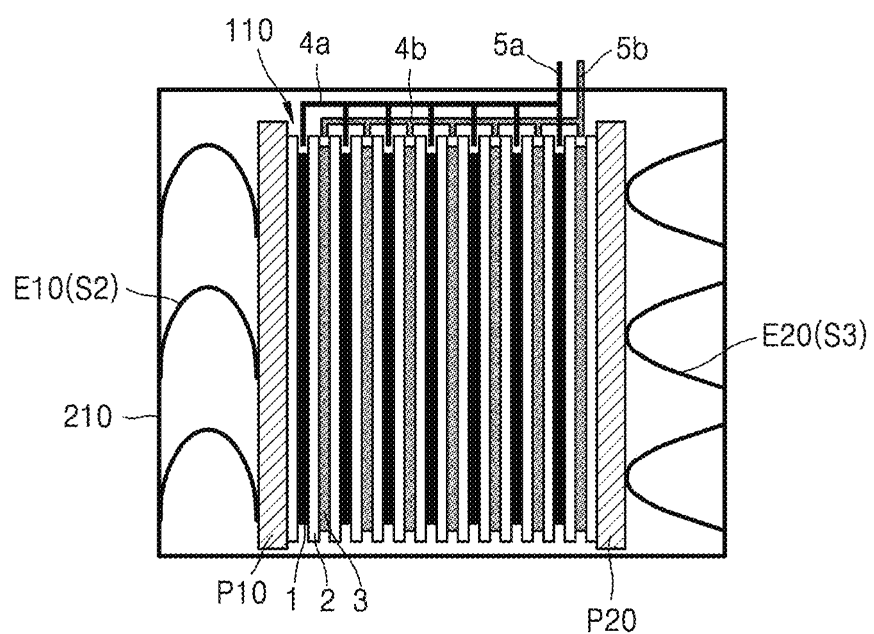
FIG. 12 is a cross-sectional view showing a battery having a battery housing structure according to another example embodiment.

FIG. 12 is a cross-sectional view showing a battery having a battery housing structure according to another example embodiment.

Referring to FIG. 12, a battery unit 110 may include a structure in which a first electrode 1, a separator 2, and a second electrode 3 are alternately stacked (a stacked structure). The battery unit 110 may further include a current collector and an outer packaging material. The first electrode 1 may be a cathode and the second electrode 3 may be an anode or vice versa. A first connecting member 4*a* connected to the plurality of first electrodes 1 may be provided. A second connecting member 4*b* connected to the plurality of second electrodes 3 may be provided. A first terminal 5*a* extending from the first connecting member 4*a* may be provided. A second terminal 5*b* extending from the second connecting member 4*b* may be provided.

An elastic member assembly (e.g., E10+E20) configured to apply a predetermined (or alternatively, desired) pressure to the battery unit 110 embedded in a case 210 may be provided. The elastic member assembly may include the first elastic member E10 having an elastic coefficient increasing in accordance with a displacement increase and the second elastic member E20 having an elastic coefficient decreasing in accordance with the displacement increase. The first plate P10 may be provided on one side of the battery unit 110 and the second plate P20 may be provided on the other side. A plurality of first elastic members E10 may be provided between the first plate P10 and the case 210. A plurality of second elastic members E20 may be provided between the second plate P20 and the case 210.

Figure 13:
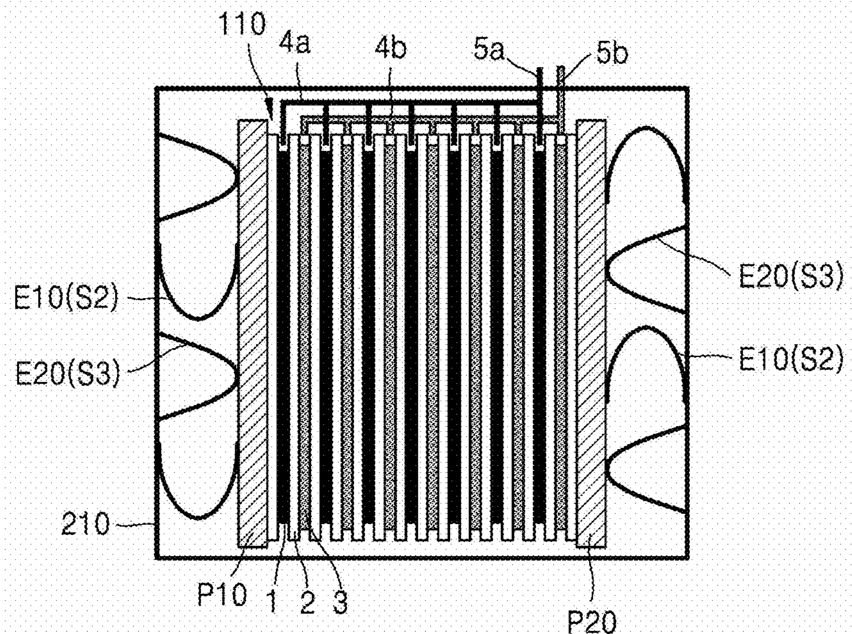
FIG. 13 is a cross-sectional view showing a battery to which a battery housing structure is applied according to another example embodiment.

The battery housing structure of FIG. 12 may be modified as shown in FIG. 13. The structure of FIG. 13 is similar to that of FIG. 9. Referring to FIG. 13, the first elastic members E10 and the second elastic members E20 may be alternately arranged between the first plate P10 and the case 210, and the first elastic members E10 and the second elastic members E20 may be alternately arranged between the second plate P20 and the case 210.

Figure 14:
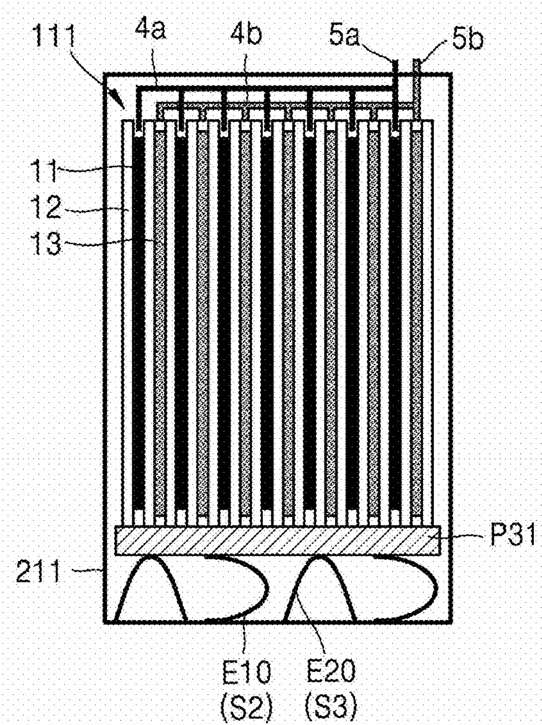
FIG. 14 is a cross-sectional view showing a battery having a battery housing structure according to another example embodiment.

FIG. 14 is a cross-sectional view showing a battery having a battery housing structure according to another example embodiment. The structure of FIG. 14 is similar to the structure of FIG. 10. Referring to FIG. 14, a plate P31 may be provided on a lower portion or an upper portion of a battery unit 111, and the first elastic members E10 and the second elastic members E20 may be alternately arranged between the plate P31 and a case 211. The battery unit 111 may include a first electrode 11, a separator 12, and a second electrode 13. A first connecting member 14*a* and a first terminal 15*a* connected to the plurality of first electrodes 11 and a second connecting member 14*b* and a terminal 15*b* connected to the plurality of second electrodes 13 may be provided.

Figure 15:
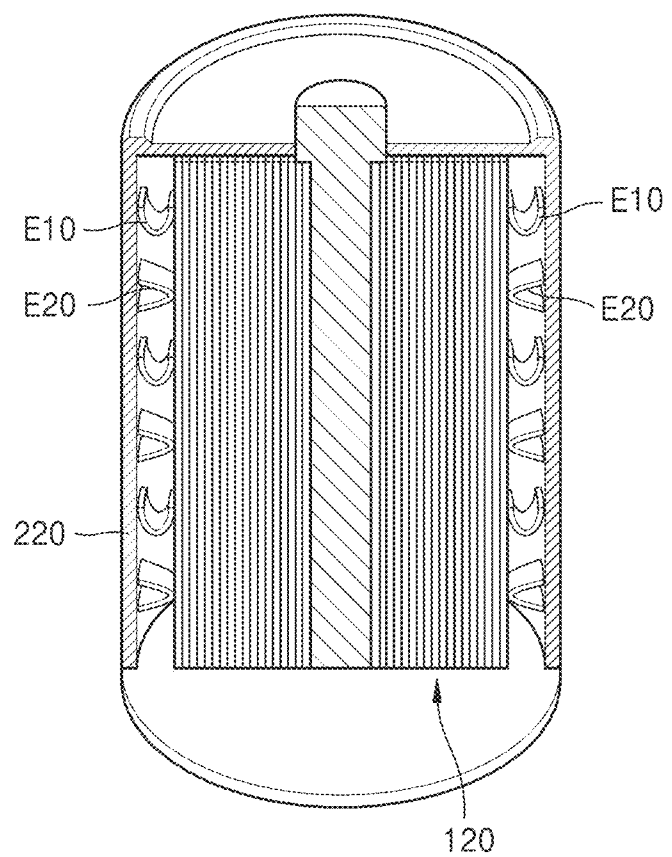
FIG. 15 is a partial exploded perspective view showing a battery having a battery housing structure according to another example embodiment.

FIG. 15 is a partial exploded perspective view showing a battery having a battery housing structure according to another example embodiment.

Referring to FIG. 15, a battery unit 120 may have a cylindrical structure. The battery unit 120 may be, in an example embodiment, a jelly roll type electrode assembly. A case 220 having a cylindrical structure may surround the battery unit 120. A plurality of first elastic members E10 and a plurality of second elastic members E20 may be uniformly or substantially uniformly dispersed around an accommodation region of the battery unit 120. The plurality of first elastic members E10 and the plurality of second elastic members E20 may constitute an elastic member assembly between the battery unit 120 and the case 220. The elastic member assembly may maintain a constant or substantially constant pressure applied to the battery unit 120 even when a volume of the elastic member assembly expands due to charging/discharging of the battery unit 120.

FIGS. 16A to 16D are cross-sectional views showing various structures of spring members that may be used in a battery housing structure according to example embodiments. The spring members of FIGS. 16A to 16D may be applied, for example, as the third spring members S3 corresponding to the second elastic members E20 of FIG. 1 and the like.

Figure 16A:
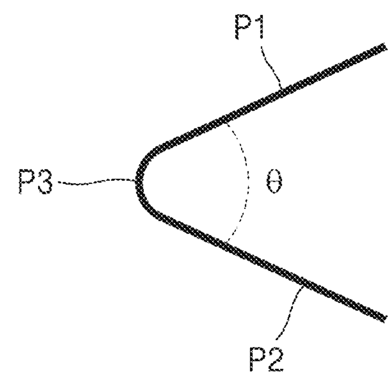
FIGS. 16A to 16D are cross-sectional views showing various structures of spring members that may be used in a battery housing structure according to example embodiments.

Referring to FIG. 16A, the spring member may include straight line type first and second portions P1 and P2. The first and second portions P1 and P2 may be connected to form a predetermined (or alternatively, desired) angle θ. A round type connector P3 may be provided between the first and second portions P1 and P2. In this regard, the angle θ may be referred to as a folding angle. The folding angle θ may be greater than about 10° and less than about 170°. Such a spring member may be an example of a V-shaped spring.

Figure 16B:
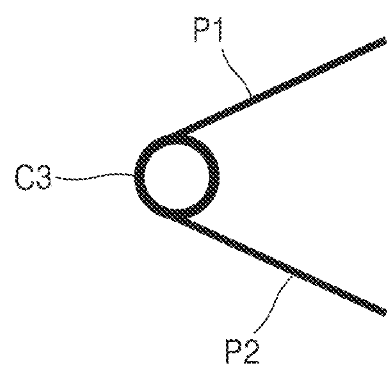

Referring to FIG. 16B, the spring member may include a ring type connector C3 connecting the first and second portions P1 and P2 between the first and second portions P1 and P2. The ring type connector C3 may have a structure in which a spring portion is wound once or twice in a central part of the spring member. The spring member may have a relatively high elasticity by the ring type connector C3. Such a spring member may be used as the third spring member S3 in the example embodiment shown in FIG. 1 and the like, and may also be used as the second spring member S2 in a state where the spring member rotates by 90°.

Figure 16C:
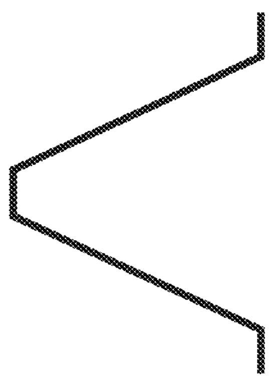

Referring to FIG. 16C, the spring member may be V-shaped as a whole, and may have flat portions in a central portion and both end portions. A position of the central portion of the spring member may be fixed to a predetermined (or alternatively, desired) support surface by the flat portion located at the central portion.

Figure 16D:
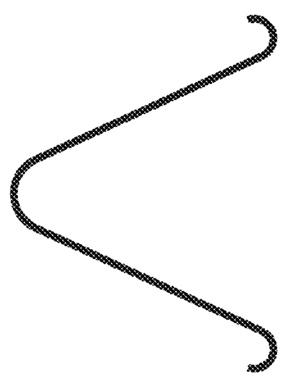

Referring to FIG. 16D, the spring member may be V-shaped as a whole, and may have a round shape at both ends. A displacement of the spring member may be made easier by the round shape of both ends.

Characteristics of at least two of the spring members of FIGS. 16A to 16D may be used in combination with each other. Also, a plurality of different type spring members may be used in one battery housing structure. The structures of the spring members described with reference to FIGS. 16A to 16D are merely examples and may be variously modified.

Figure 17:
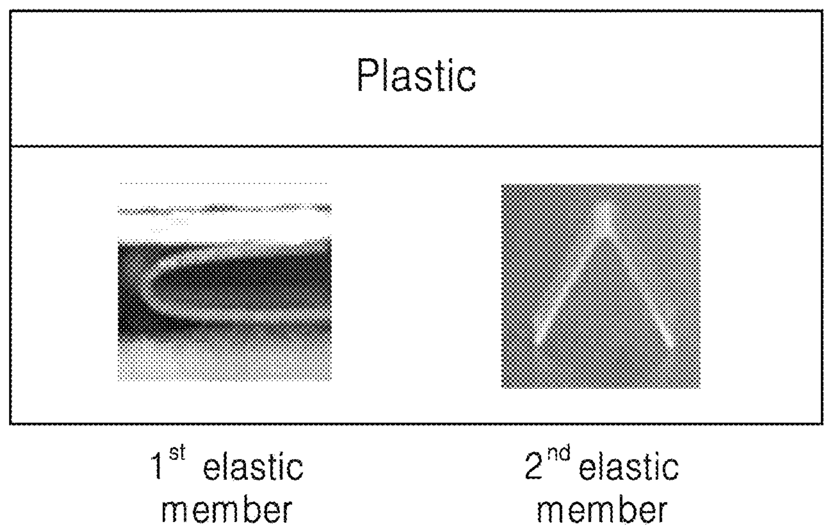
FIG. 17 is a photographic image example showing a first elastic member and a second elastic member which may be used in a battery housing structure according to an example embodiment.

FIG. 17 is a photographic image example showing a first elastic member and a second elastic member which may be used in a battery housing structure according to an example embodiment.

Figure 18:
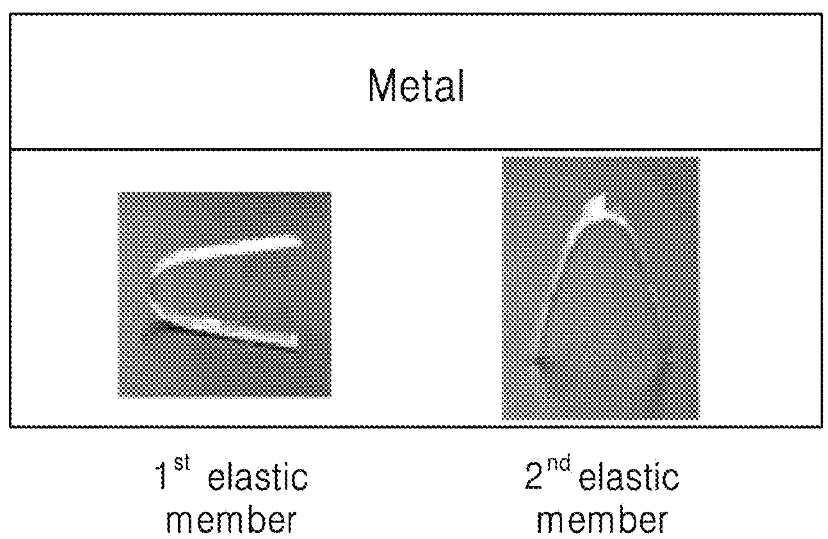
FIG. 18 is a photographic image example showing a first elastic member and a second elastic member which may be used in a battery housing structure according to another example embodiment.

FIG. 18 is a photographic image example showing a first elastic member and a second elastic member which may be used in a battery housing structure according to another example embodiment.

FIG. 17 shows a case where the first elastic member and the second elastic member are manufactured using a plastic material such as PET (polyethylene terephthalate). FIG. 18 shows a case where the first elastic member and the second elastic member may include a metal such as Al and Cu. Referring to FIGS. 17 and 18, the first elastic member may have a U-shape or a similar shape, and the second elastic member may have a V shape or a similar shape.

When the first elastic member and the second elastic member of the PET plastic material are used as shown in FIG. 17, when an area of a battery cell is about $120 \times 60\ mm^2$, a range of a fixing pressure applied to the battery cell by the plurality of first and second elastic members may be less than about 30 MPa (about 29 atm). At this time, one elastic member (the first or second elastic member) may be disposed for each 1×1 $cm^2$ area, and the first and second elastic members may be alternately arranged.

When the first elastic member and the second elastic member of the metal material such as Al and Cu are used as shown in FIG. 18, when the area of the battery cell is about 120×60 $mm^2$, a range of a fixing pressure applied to the battery cell by the plurality of first and second elastic members may be less than about 200 MPa (about 193 atm). At this time, one elastic member (the first or second elastic member) may be disposed for each 1×1 $cm^2$ area, and the first and second elastic members may be alternately arranged.

The materials of the elastic members and the ranges of the fixing pressure described with reference to FIGS. 17 and 18 are merely examples, and an elastic coefficient may be variously adjusted according to a shape, material, and dimension of the elastic member, and may provide an appropriate pressure according to a use environment. The elastic member may be formed of various materials such as metal, plastic, and organic-inorganic composites. The C-shaped or U-shaped elastic member may change the elastic coefficient according to a radius of curvature of the central portion. The V-shaped elastic member may change the elastic coefficient according to a folding angle.

The battery housing structure (a pressure control pack) according to the above example embodiments may be used as a pack including a secondary battery having a pouch, cylinder, prism or coin cell structure, and may be applied to electric vehicles, mobile devices, and batteries in various other fields. The secondary battery may be various types of batteries such as a lithium ion battery, a lithium metal battery, and a metal-air battery. A kind of the secondary battery is not limited to the above-described kind, and may be variously changed. A battery unit or a battery cell included therein may have the pouch, cylinder, prism or coin cell structure. A battery housing may have various shapes. Also, the battery housing structure according to the example embodiments may be applied not only to a cell unit and a module unit but also to a pack unit.

When the battery housing structure (the pressure control pack) according to the example embodiments is used, for example, a CRR of a battery may increase by about 5% or more or about 7% or more. Therefore, the lifetime and replacement cycle of the battery may increase and/or a cost saving effect may be obtained. Considering a market size in the field of electric vehicles and a battery price, a higher level of annual cost savings may be achieved. The battery housing structure (the pressure control pack) according to the example embodiments may be advantageously applied not only to electric vehicles but also to various other fields in order to improve battery performance and maintain efficiency.

Although many items are presented in detail in one description, they are not limit the scope of the disclosure, but are to be interpreted as an example of an example embodiment. For example, one of ordinary skill in the art could understand that the battery housing structure and the structure of the battery apparatus using the battery housing structure described with reference to FIGS. 1 and 9 to 18 may be variously modified. In a specific example, in the example embodiment of FIG. 9, the plurality of first elastic members E10 and the plurality of second elastic members E20 are disposed on both sides of the battery unit 100. In some cases, the plurality of first elastic members E10 and the plurality of second elastic members E20 are disposed on only one side of the battery unit 100. Also, it will also be appreciated that a type and arrangement of the battery cell 10 may vary and that structures and arrangement of the first and second elastic members E10 and E20 may vary. Also, in some cases, it will also be understood that the plates P10, P20, P30 and P30*a* may not be used. Also, it will also be appreciated that the battery housing structure according to the example embodiments may be applied to various chemical reactors requiring a fixing pressure as well as a battery. Therefore, the scope of the disclosure should be determined not by the above-described example embodiments, but by the technical concept set forth in the claims.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A battery housing structure comprising:

a case comprising an accommodation region in which a battery unit comprising at least one battery cell is accommodated; and at least two elastic members in the case and configured to apply a pressure to the battery unit accommodated in the accommodation region, wherein the at least two elastic members comprise at least one first elastic member having an elastic coefficient that increases when a displacement increases and at least one second elastic member having an elastic coefficient that decreases when the displacement increases, and the at least one first elastic member and the at least one second elastic member are not directly connected with each other.

2. The battery housing structure of claim 1, wherein the at least one first elastic member and the at least one second elastic member have different structures or are arranged in different directions.

3. The battery housing structure of claim 1, wherein the at least two elastic members are configured such that a change range of the pressure applied to the battery unit is within 10% of an initial pressure with respect to a dimension change during charging and discharging of the battery unit.

4. The battery housing structure of claim 1, wherein the at least two elastic members are configured such that a total elastic coefficient varies within 10% with respect to a volume change of the accommodation region corresponding to a dimension change during charging and discharging of the battery unit.

5. The battery housing structure of claim 1, wherein the at least two elastic members comprise the at least one first elastic member and the at least one second elastic member alternately arranged in a lower portion or an upper portion of the accommodation region.

6. The battery housing structure of claim 1, wherein the at least two elastic members comprise one or more spring members, and wherein the one or more spring members comprise one of a metal, an organic polymer, and an organic-inorganic composite.

7. The battery housing structure of claim 1, wherein the accommodation region has a cylindrical shape, and wherein the at least two elastic members comprise a plurality of first elastic members and a plurality of second elastic members around the accommodation region.

8. The battery housing structure of claim 1, wherein the at least two elastic members comprise:

a plurality of first elastic members on a first side of the accommodation region and a plurality of second elastic members on a second side of the accommodation region, or the at least one first elastic member and the at least one second elastic member alternately arranged on each of the first side and the second side of the accommodation region.

9. The battery housing structure of claim 1, wherein the at least one first elastic member comprises a coil type first spring member or a second spring member having a structure bent in a direction perpendicular to a displacement direction, and wherein the at least one second elastic member comprises a third spring member having a structure bent in a direction parallel to the displacement direction.

10. The battery housing structure of claim 9, wherein the third spring member has a folding angle greater than 10° and less than 170°.

11. The battery housing structure of claim 9, wherein the second spring member has a radius of curvature greater than zero and less than 100 mm at its central portion.

12. The battery housing structure of claim 9, wherein the second spring member has a C-shaped or U-shaped structure and has an open structure in the direction perpendicular to the displacement direction, and wherein the third spring member has a V-shaped, C-shaped or U-shaped structure and has an open structure in the direction parallel to the displacement direction.

13. The battery housing structure of claim 9, wherein at least one of the second spring member and the third spring member comprises:

first and second portions that form an angle; and a ring shape connector between the first and second portions to connect the first and second portions.

14. The battery housing structure of claim 1, further comprising: a third plate in a lower portion or an upper portion of the accommodation region in the case, wherein at least a part of the at least two elastic members are between the third plate and the case.

15. The battery housing structure of claim 14, wherein the at least two elastic members comprise the at least one first elastic member and the at least one second elastic member between the third plate and the case.

16. The battery housing structure of claim 1, further comprising:

a first plate on a first surface side of the accommodation region in the case; and a second plate on a second surface side of the accommodation region, wherein the at least two elastic members are between the first plate and the case and between the second plate and the case.

17. The battery housing structure of claim 16, wherein the at least two elastic members comprise:

a plurality of first elastic members between the first plate and the case; and a plurality of second elastic members between the second plate and the case.

18. The battery housing structure of claim 16, wherein the at least two elastic members comprise:

a plurality of first elastic members and a plurality of second elastic members alternately between the first plate and the case; and a plurality of first elastic members and a plurality of second elastic members alternately between the second plate and the case.

19. A battery apparatus comprising:

the battery housing structure of claim 1; and the battery unit in the accommodation region of the battery housing structure.

20. The battery apparatus of claim 19, wherein the battery unit comprises at least one battery cell, and wherein the battery unit or the at least one battery cell has a pouch, cylinder, prism, or coin cell structure.

* * * * *